US009470799B2

(12) United States Patent
Unfors et al.

(10) Patent No.: US 9,470,799 B2
(45) Date of Patent: Oct. 18, 2016

(54) RADIATION METER AND METHOD

(75) Inventors: Tomas Unfors, Billdal (SE); Per Klockar, Torslanda (SE)

(73) Assignee: UNFORS RAYSAFE AB, Billdal (SE)

( * ) Notice: Subject to any disclaimer, the term of this patent is extended or adjusted under 35 U.S.C. 154(b) by 99 days.

(21) Appl. No.: 14/116,766

(22) PCT Filed: May 14, 2012

(86) PCT No.: PCT/SE2012/050512
§ 371 (c)(1),
(2), (4) Date: Jan. 9, 2014

(87) PCT Pub. No.: WO2012/158106
PCT Pub. Date: Nov. 22, 2012

(65) Prior Publication Data

US 2014/0124679 A1 May 8, 2014

Related U.S. Application Data

(60) Provisional application No. 61/485,665, filed on May 13, 2011.

(30) Foreign Application Priority Data

May 13, 2011 (SE) ...................................... 1150437

(51) Int. Cl.
*G01T 1/02* (2006.01)
*H05G 1/26* (2006.01)

(52) U.S. Cl.
CPC ................. *G01T 1/02* (2013.01); *G01T 1/026* (2013.01); *H05G 1/26* (2013.01)

(58) Field of Classification Search
CPC ................................ G01T 1/02; G01T 1/026
See application file for complete search history.

(56) References Cited

U.S. PATENT DOCUMENTS 4,642,463 A 2/1987 Thoms
4,672,309 A 6/1987 Gandhi
(Continued)

FOREIGN PATENT DOCUMENTS

JP 3304566 B2 5/1995

OTHER PUBLICATIONS

International Search Report from corresponding International Application No. PCT/SE2012/050512, mailed on Sep. 25, 2012.
(Continued)

*Primary Examiner* — Yara B Green
(74) *Attorney, Agent, or Firm* — Renner, Otto, Boiselle & Sklar, LLP.

(57) ABSTRACT

The present invention relates to a method and radiation monitoring device (10) comprising at least one radiation detector (111), a memory (112) and a controller (12), wherein said radiation detector is arranged to detect at least one type of radiation dose. The memory (112) comprises a number of memory positions configured to store data resulting from said detector (111) detection. The positions are configured to store accumulated measured dose values corresponding to consecutive real time intervals. The controller is configured to continuously compute mean radiation dose values for measured and stored radiation doses during the predetermined time period and for each computation, a resulting mean value is compared with a corresponding predetermined reference value and generate a signal corresponding to result of said comparison.

12 Claims, 3 Drawing Sheets

(56) References Cited

U.S. PATENT DOCUMENTS

| | | |
|---|---|---|
| 5,477,050 A | 12/1995 | Kronenberg et al. |
| 2002/0084423 A1 | 7/2002 | Ferralli |
| 2005/0244013 A1 | 11/2005 | Battenberg et al. |
| 2008/0103834 A1* | 5/2008 | Reiner .............................. 705/3 |
| 2011/0024640 A1* | 2/2011 | Kahilainen et al. ..... 250/370.07 |

OTHER PUBLICATIONS

International Preliminary Report on Patentability from corresponding International Application No. PCT/SE2012/050512, mailed on Jul. 25, 2012.

\* cited by examiner

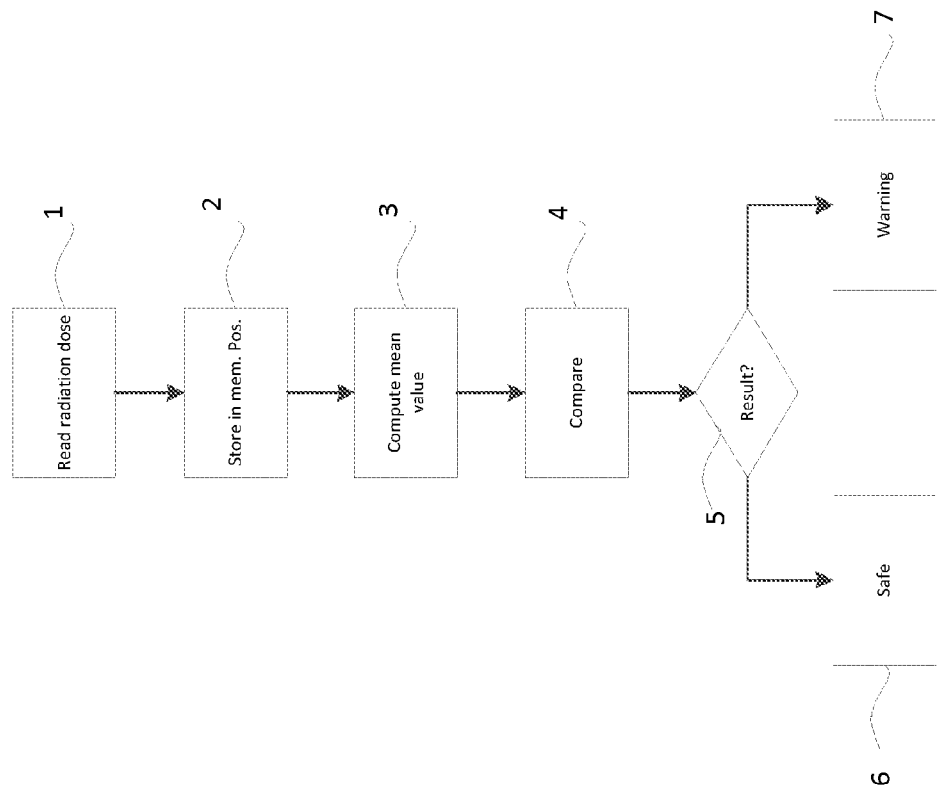

RADIATION METER AND METHOD

TECHNICAL FIELD

The present invention relates to monitors for radiation, and in particular to radiation dose meters.

BACKGROUND

Human tissue is sensitive for different types of radiation. The radiation which may consist of energy bins may affect cell structures when it hits the human body. Ionizing radiation, for example, can change the structure of the cells, sometimes creating potentially harmful effects that are more likely to cause changes in tissue. These changes can interfere with cellular processes so cells might not be able to divide or they might divide too much, resulting in cancer.

Radiation dose meters are common for use in industries, hospitals, dentist sites, etc. in which the presence of and exposure to low levels of radiation is a hazard and must be monitored. In a hospital or at dentist, for example, patients, physicians and nurses may also encounter situations in which they may risk exposure to radiation and require a means of monitoring such exposure.

The radiation dose meters of today normally provide a direct value in a predetermined unit. However, to present measured values in this way normally is not easy to be understood by none-expert users and to be interpret to a relevant radiation dose situation and consequently unclear for the user how to avoid unnecessary exposure to radiation, which may increase health hazard.

Authorities have specified some radiation dose limits, which should not be exceeded for individuals/groups of people, to reasonably limit humans' health risks for radiation.

U.S. Pat. No. 4,642,463 relates to a radiation monitor, which includes a radiation detector, a digital processor and a display. The digital processor is responsive to externally input information corresponding to alarm radiation rate, alarm radiation dose and alarm time-to-go. The digital processor integrates the perceived real time radiation rate to produce total dose information. The processor can then compare total dose information to alarm dose, compare sensed radiation rates to alarm rate and compute time-to-go, by dividing the difference between alarm dose and total dose by the present radiation rate, and finally comparing computed time-to-go to alarm time to go. The processor initiates an alarm condition for altering the user of sensed radiation rate exceeds alarm radiation rate, if total dose information exceeds alarm dose information or if time-to-go, as computed, is less than alarm time-to-go information. Additional functions performed include determination of expected dose, first opportunity computations and decay time-to-go computations. In all these computations the processor is capable of extrapolating predicted radiation rates. Thus, this document describes a technique using accumulated dose while the present invention uses continues running mean value and radiation intensity. There is also a difference in when and how a warning is provided. While the present invention provides a warning for whether the radiation at the current time is safe or not, this document provides information on how long it is left before the radiation is unsafe.

U.S. Pat. No. 7,592,603 relates to a radiation detector performing both rate and dose measurements for personal safety and also to provide measurements that are sufficiently sensitive for security applications. In one embodiment, a radiation detector has a first measurement channel and a second measurement channel, where the second measurement channel can measure radiation at levels that would saturate the first measurement channel.

SUMMARY OF THE INVENTION

One of the objects of the present invention is to provide an arrangement for measuring and providing measurement value, which is easy to be apprehended and indicates that the current radiation dose over a predetermined time interval should be avoided under a longer time interval to avoid health risks.

For this reason the present invention relates to a radiation monitoring device comprising at least one radiation detector, a memory and a controller, wherein the radiation detector is arranged to detect at least one type of radiation dose. The memory comprises a number of memory positions configured to store data resulting from the detector detection. The positions are configured to store accumulated measured dose values corresponding to consecutive real time intervals. The controller is configured to continuously compute mean radiation dose values for measured and stored radiation doses during the predetermined time period and for each computation, a resulting mean value is compared with a corresponding predetermined reference value and generate a signal corresponding to the comparison. The device may further comprise a display unit. Depending on one or several current mean values exceeding or being below a corresponding reference value for a chosen time interval, the controller is configured to generate a control signal for displaying a specific symbol on the display. The time interval is one or several of second, minute, hours, day, week, month or year. The memory unit comprises a number of memory cells, each cell for storing a radiation dose data within a predetermined time interval, wherein $cell_n$ is configured to store a radiation dose under a time interval n and $cell_{n+1}$ stores radiation dose in a subsequent real time interval. A total number of cells correspond to a relevant larger time interval than a largest chosen measuring time interval n. The device may be configured to control one or several indicators to indicate a first symbol apprehended as safe radiation dose exposure and one or several second symbols apprehended as unsafe radiation dose exposure. The radiation dose is a functional of dose intensity as a function of a time period −a to t:

$$\text{Radiation dose} = \int_{-a}^{t} \text{dose intensity}\, dt$$

The device may be intended for monitoring different type of radiations comprising ionized radiation, being one or several of alpha particles, beta particles, gamma rays, X-ray radiation, and neutrons, and non-ionized radiations, being one of several of radio waves, light (UV and IR) or a combination of radiations. The device may comprise means for detecting the position on which the device is installed.

The invention also relates to a method of monitoring radiation by means of a radiation monitoring device comprising at least one radiation detector, a memory and a controller. The radiation detector is arranged to detect at least one type of radiation dose. The memory comprises a number of memory positions configured to store data resulting from the detector detection. The method comprising: storing in the positions accumulated measured dose values corresponding to consecutive real time intervals, continuously computing mean radiation dose values for measured and stored radiation doses during the predetermined time period and for each computation, and comparing a resulting mean value with a corresponding predetermined reference value and generate a signal corresponding to the comparison.

BRIEF DESCRIPTION OF THE DRAWINGS

In the following, the invention is described with references to exemplary embodiments illustrated in the attached drawings, in which:

FIG. 2 is an exemplary graph illustrating the relationship between dose intensity and time period for reference dose values and FIG. 3 illustrates exemplary method steps of the invention.

DETAILED DESCRIPTION

Figure 1:
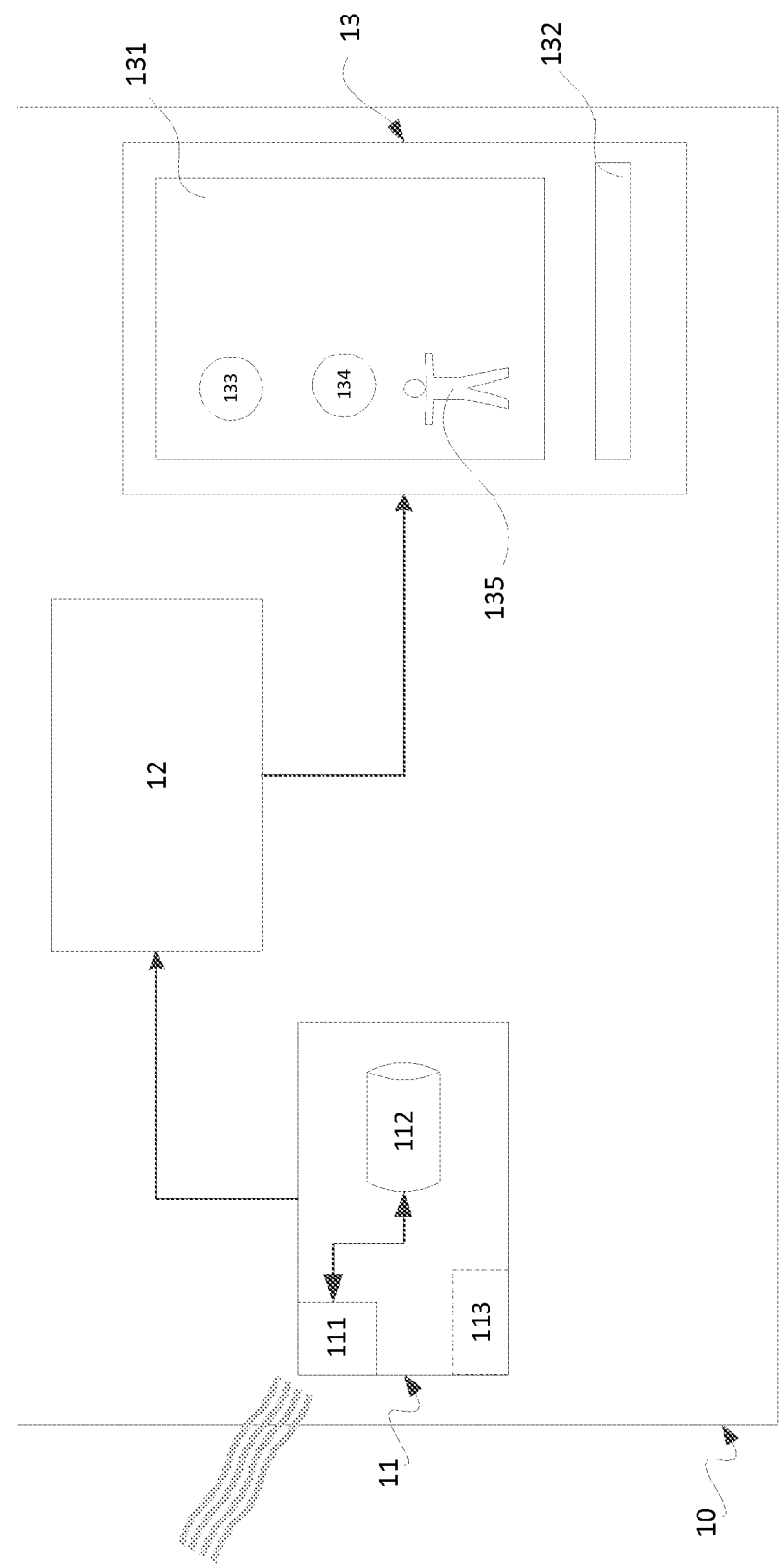
FIG. 1 is a schematic block diagram of a radiation dose measuring device according to the present invention.

FIG. 1 is a schematic block diagram of a radiation dose measuring device 10 according to the present invention. The device comprises a measuring part 11, a controller 12, and a display unit 13. Power source and other units not relevant for the invention are not illustrated.

The measuring part 11 comprises a detector 111 and a memory unit 112. The measuring part 11 may also comprise (in addition to or instead of detector 111) an input 113 for receiving measured dose. One or several types of detectors may be incorporated.

The memory unit 112 may comprise a number of memory cells, each cell for storing a radiation dose data within a predetermined time interval. The time interval may be a time unit, such as second, minute, hour, day, week, etc. The memory cell structure is configured such that $cell_n$ stores the radiation dose under time interval n and $cell_{n+1}$ stores radiation dose in the subsequent real time interval, and so on. Preferably, the total number of cells should correspond to a relevant much larger time interval than the largest chosen measuring time interval n, e.g. months or years.

The memory unit 112 may be part of the main memory of the device.

The controller 12 is configured to execute instructions (e.g. stored in a memory not shown). The instructions may comprise instruction set for controlling the measuring unit 11, the display unit 13 and other internal functionalities. The instructions also comprise a number of computational instructions which continuously compute (current) mean values for the radiation dose during the predetermined time period (e.g. second, minute, hour, day, week, etc.). For each new computation, the resulting mean value is compared with predetermined reference values. If one or several current mean values exceed corresponding reference value for chosen time interval, a control signal is generated to the display unit 13.

The reference values and time periods may be preprogrammed for specific applications or changed for different applications.

Figure 2:
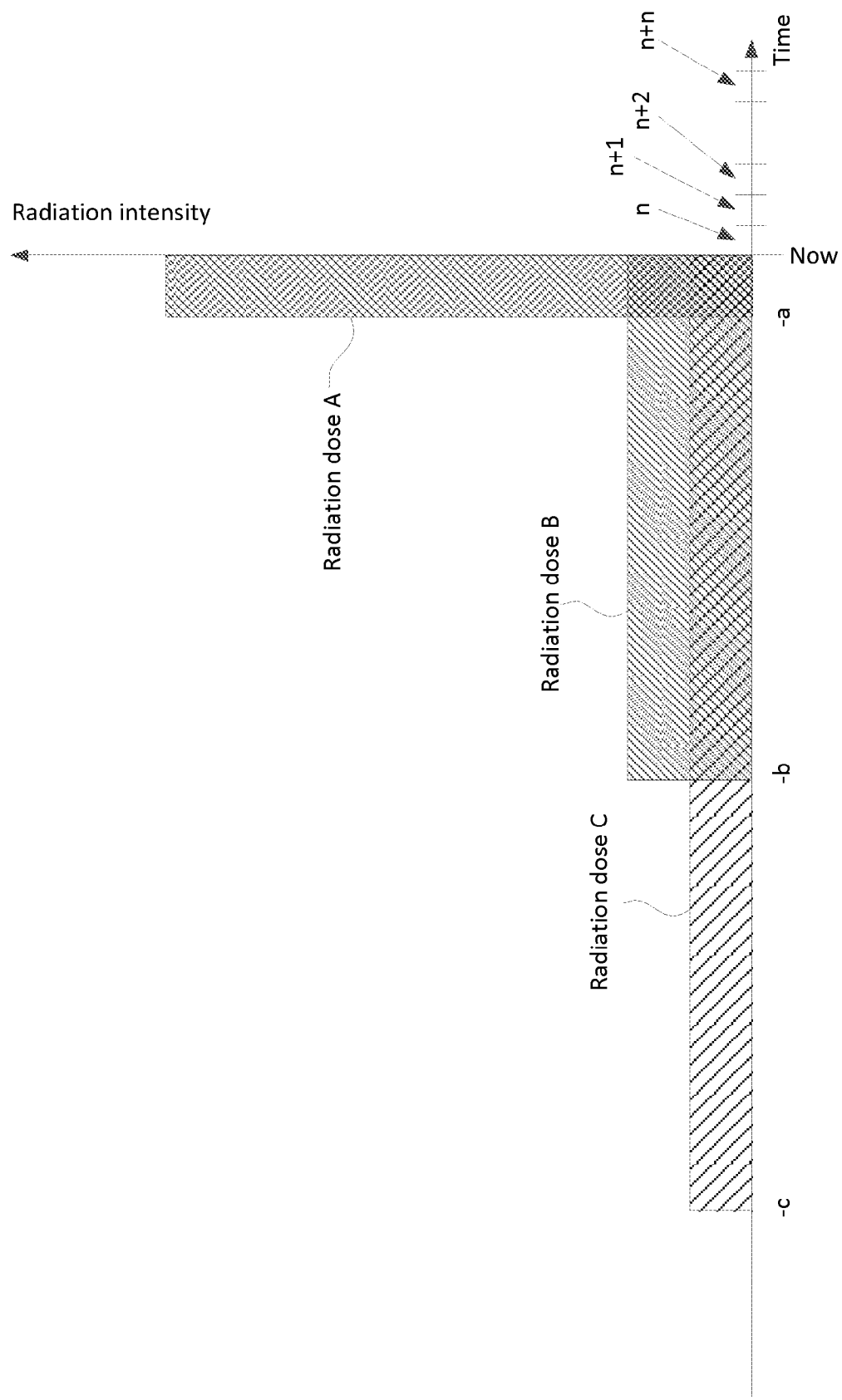

FIG. 2 is an exemplary graph illustrating the relationship between reference doses and time period.

According to graph of FIG. 2 following relations may be valid:

Radiation dose A<Radiation dose B<Radiation dose C

|a|<|b|<|c|

Wherein:

$$\text{Radiation dose } A = \int_{-a}^{now} \text{dose intensity } dt$$

$$\text{Radiation dose } B = \int_{-b}^{now} \text{dose intensity } dt$$

$$\text{Radiation dose } C = \int_{-c}^{now} \text{dose intensity } dt$$

For example, radiation dose A may be 100 µSv, radiation dose B may be 200 µSv and radiation dose C may be 300 µSv.

When computing, the controller compares radiation dose A with the real radiation dose for the time interval a. If the radiation dose>radiation dose A (reference value according to FIG. 2) a signal is transmitted to the display unit. Same computation and comparisons are made to for the time intervals b and c to radiation doses B and C, respectively The display unit 13 comprises, for example a Liquid Crystal Display (LCD) portion 131 (or any other suitable display technique), which may be controlled by the controller 12 or a display driver (not shown), well known for a skilled person. The display portion may be colour display or "black and white". The display unit may also be provided with an identification field 132, identifying the user, i.e. a person or a subject carrying the radiation dose monitoring device 10.

The display unit 13 is configured to provide information to a user in a simple but accurate manner. For this reason the display portion 131 may display a number of symbols reproducing the detected radiation dose. For example, a first symbol 133 may only indicate that the radiation dose is within an acceptable limit by only displaying "OK". One or several symbols 134 may be used to provided information for a time interval during which current radiation dose is compared to respective reference radiation dose. The display portion may also provide information 135 about the position on the user the radiation dose monitoring device is carried.

The position in which the device is carried, is important because the amount of radiation varies depending on, e.g. if the user carries additional protection, field of use etc., and thus the reference values depend on the position.

During the monitoring operation, if none of the current mean values of the measured radiation doses exceed respective reference value, the acceptable limit symbol ("OK") is displayed. If the current radiation dose A exceeds reference radiation dose A, a corresponding symbol (134) may be displayed. This symbol may for example be "Warning", red coloured symbol (or any other warning symbol) or combinations thereof. This symbol may be displayed until measured radiation dose mean value during the latest measuring interval "a" is below the reference radiation dose A. The acceptable limit symbol is off while the warning symbol is displayed. Thus, there is no need for displaying dose level values which are not understood by non-experts.

If several current radiation doses (A, B, C) exceed the respective reference dose (A, B, C), a corresponding symbol may be displayed.

In one embodiment, if the user obtains indication (134) corresponding to a warning, the radiation dose intensity as function of time may be analyzed in more detail. Data in the memory unit 112 can be transferred to a database using wired or wireless communication, for further analyses.

In yet another embodiment, the device doesn't have a display and continuously communicate with other information displaying units or a central computer at a monitoring site.

The device of the invention may be used for monitoring any type of radiations, e.g. ionized radiation such as alpha particles, beta particles, gamma rays, X-ray radiation, and neutrons, and non-ionized radiations, such as radio waves, light (UV and IR) or a combination of radiations.

In yet another embodiment, the device may be configured to detect the position it is carried on, e.g. by detecting altitude, ambient material, etc.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. A radiation monitoring device configured to generate a signal notifying for further exposure to a radiation dose with respect to a current radiation dose over a predetermined time interval and comprising:
    at least one radiation detector arranged to detect at least one type of radiation dose intensity,
    a memory comprising a number of memory positions configured to store data resulting from said at least one radiation detector detection, said positions being configured to store accumulated measured dose values corresponding to consecutive real time intervals, the memory further comprising a number of memory cells, each cell configured for storing a radiation dose data within a predetermined time interval, such that $cell_n$ is configured to store a radiation dose under a time interval n and $cell_{n+1}$ stores radiation dose in a subsequent real time interval, wherein a total number of cells corresponds to a relevant larger time interval than a largest chosen measuring time interval n; and
    a controller configured to continuously compute and generate mean radiation dose intensity values for measured and stored radiation doses during a predetermined time period and for each computation, compare a resulting mean radiation dose intensity value with a corresponding predetermined reference value and generate a signal corresponding to a result of said comparison, said resulting signal indicating, when the resulting mean radiation dose intensity value exceeds the corresponding predetermined reference value, that the current radiation dose over the predetermined time interval is to be avoided under a time interval longer than the predetermined time interval to avoid health risks.

2. The radiation monitoring device of claim 1, further comprising a display unit.

3. The radiation monitoring device of claim 2, wherein the controller is configured to generate a control signal for displaying a specific symbol on said display depending on one or several current mean values exceeding or being below a corresponding reference value for a chosen time interval.

4. The radiation monitoring device of claim 3, wherein said chosen time interval is one or several of second, minute, hour, day, week, month or year.

5. The radiation monitoring device of claim 2, comprising one or several indicators configured to indicate a first symbol apprehended as safe radiation dose exposure and one or several second symbols apprehended as unsafe radiation dose exposure.

6. The radiation monitoring device of claim 1, wherein said radiation dose intensity is a function of a time period –a to t: Radiation dose $=\int_{-a}^{t}$ dose intensity dt
    wherein t is current time.

7. The radiation monitoring device of claim 1, comprising one or several detectors for monitoring different type of radiations
    comprising: one or several of: ionized radiation, being one or several of alpha particles, beta particles, gamma rays, X-ray radiation, and neutrons, and non-ionized radiations, being one of several of radio waves, light (UV and IR) or a combination of radiations.

8. The radiation monitoring device of claim 1, wherein the radiation monitoring device is configured to detect the position on which the radiation monitoring device is installed.

9. A method of monitoring radiation by means of a radiation monitoring device including:
- at least one radiation detector arranged to detect at least one type of radiation dose intensity,
- a memory including a number of memory positions configured to store data resulting from said at least one radiation detector detection, the memory further comprising a number of memory cells, each cell configured for storing a radiation dose data within a predetermined time interval, such that $cell_n$ is configured to store a radiation dose under a time interval n and $cell_{+1}$ stores radiation dose in a subsequent real time interval, wherein a total number of cells corresponds to a relevant larger time interval than a largest chosen measuring time interval n; and
- a controller, the method comprising:
- continuously storing in said memory positions accumulated measured intensity of dose values corresponding to consecutive real time intervals,
- continuously computing mean radiation dose values for measured and stored radiation doses during a predetermined time period and for each computation,
- continuously comparing a resulting mean intensity value with a corresponding predetermined reference value, and
- generating a signal, which, when the resulting mean radiation dose intensity value exceeds the corresponding predetermined reference value, notifies that further exposure to a radiation dose with respect to a current radiation over a predetermined time interval is to be avoided under a time interval longer than the predetermined time interval to avoid health risks.

10. The method of claim 9, wherein based on result of said comparison:
- generating a first symbol comprehended as a first radiation dose level intensity, or
- generating a second symbol comprehended as a second radiation dose level intensity.

11. A radiation monitoring device configured to generate a signal notifying for further exposure to a radiation dose with respect to a current radiation dose over a predetermined time interval and comprising:
- at least one radiation detector arranged to detect at least one type of radiation dose intensity,
- a memory comprising a number of memory positions configured to store data resulting from said at least one radiation detector detection, said positions being configured to store accumulated measured dose values corresponding to consecutive real time intervals, the memory further comprising a number of memory cells, each cell configured for storing a radiation dose data within a predetermined time interval, such that $cell_n$ is configured to store a radiation dose under a time interval n and $cell_{+1}$ stores radiation dose in a subsequent real time interval, wherein a total number of cells corresponds to a relevant larger time interval than a largest chosen measuring time interval n;
- a controller configured to continuously compute and generate mean radiation dose intensity values for measured and stored radiation doses during predetermined time period and for each computation, compare a resulting continuous mean value with a corresponding predetermined reference value and generate a signal corresponding to result of said comparison, said resulting signal indicating at least a level to a specific radiation dose intensity at a specific time, and
- a display comprising a viewing field for displaying an image with respect to said resulting signal, wherein the display is configured to, if none of current mean values of the measured radiation doses exceed respective reference value, a symbol for acceptable dose limit is displayed and if the current radiation dose exceeds a reference radiation dose, a corresponding warning symbol is displayed.

12. The radiation monitoring device of claim 11, wherein said symbols comprise one or several of characters, colors or images.

* * * * *